United States Patent [19]

Cussler

[11] Patent Number: 4,828,701
[45] Date of Patent: May 9, 1989

[54] TEMPERATURE-SENSITIVE METHOD OF SIZE-SELECTIVE EXTRACTION FROM SOLUTION

[75] Inventor: Edward L. Cussler, Edina, Minn.

[73] Assignee: Regents of the University of Minnesota, Minneapolis, Minn.

[21] Appl. No.: 128,959

[22] Filed: Dec. 8, 1987

Related U.S. Application Data

[63] Continuation of Ser. No. 791,522, Oct. 25, 1985, abandoned, which is a continuation-in-part of Ser. No. 526,275, Aug. 25, 1983, Pat. No. 4,555,344.

[51] Int. Cl.$^4$ ............................................. B01D 15/00
[52] U.S. Cl. ................................... 210/634; 210/670; 210/689; 210/774
[58] Field of Search ............... 210/634, 635, 642, 644, 210/648, 670, 673, 674, 689, 734, 774

[56] References Cited

U.S. PATENT DOCUMENTS

| | | | |
|---|---|---|---|
| 3,386,912 | 6/1968 | Lazare | 210/648 |
| 3,658,745 | 4/1972 | Merrill et al. | 210/689 |
| 3,721,621 | 3/1973 | Hough | 210/648 |
| 3,817,379 | 6/1974 | Zipilivan et al. | 210/94 |
| 3,925,017 | 12/1975 | Updike | 210/635 |
| 3,968,093 | 7/1976 | Hasegawa et al. | 210/734 |
| 4,555,344 | 11/1985 | Cussler | 210/670 |

OTHER PUBLICATIONS

N. A. Peppas and E. W. Merrill, *J. Biomed. Mater. Res.*, 11, 423 (1977).
E. W. Merrill et al., *J. Appl. Physiol.*, 29, 723 (1970).

Primary Examiner—W. Gary Jones
Attorney, Agent, or Firm—Merchant, Gould, Smith, Edell, Welter & Schmidt

[57] ABSTRACT

A separation method utilizing the ability of temperature-sensitive cross-linked polymer gels to selectively extract solvent from a solution of a macromolecular material. A feed solution containing macromolecules is added to a small amount of gel. The gel swells to absorb the low molecular weight solvent, but it cannot absorb the macromolecules. The raffinate, which is now a concentrated macromolecular solution, is drawn off. To regenerate, the filtered gel is warmed, so that its volume decreases sharply. This suddenly decreased volume occurs because the gel is near a critical point. The solvent is removed from the shrunken gel. The temperature of the gel is then lowered; more feed solution is added; and the cycle is begun again.

7 Claims, 2 Drawing Sheets

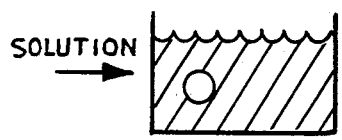
STEP 1: ADD SOLUTION TO COOL, COLLAPSED GEL. GEL SWELLS PREFERENTIALLY ABSORBING SOLVENT.

STEP 2: WITHDRAW NON-ABSORBED RAFFINATE, NOW A CONCENTRATED SOLUTION.

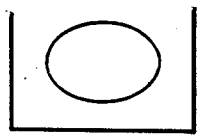
STEP 3: RECOVER SWOLLEN GEL BY FILTRATION OR CENTRIFUGATION.

STEP 4: WARM THE GEL, WHICH SHRINKS DRASTICALLY, WITHDRAW RELEASED SOLVENT

STEP 5: COOL THE GEL SO THAT IT IS READY FOR RE-USE IN STEP 1.

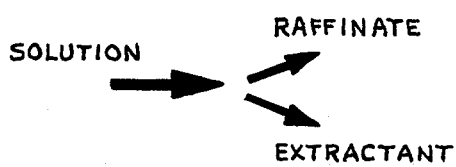
RESULT: SOLVENT AND SOLUTE ARE SEPARATED BY THE GEL FUNCTIONING AS AN EXTRACTION SOLVENT.

FIG. 2

TEMPERATURE-SENSITIVE METHOD OF SIZE-SELECTIVE EXTRACTION FROM SOLUTION

The invention described herein was made in the course of work under a grant or award from the National Science Foundation.

This is a continuation, of application Ser. No. 791,522, filed Oct. 25, 1985, now abandoned, which is a continuation-in-part of my copending application Ser. No. 526,275, filed Aug. 25, 1983, now U.S. Pat. No. 4,555,344, issued Nov. 26, 1985.

BACKGROUND OF THE INVENTION

1. Field of the Invention

This invention relates to a method of selectively extracting low molecular weight solvents to concentrate higher molecular weight solutes in solutions therein by the use of temperature-sensitive cross-linked polymer gels. Such gels absorb low molecular weight solvents, such as water, but not high molecular weight solutes, such as proteins. The high molecular weight solute is recovered as a concentrated solution. In my aforesaid copending application Ser. No. 526,275, now U.S. Pat. No. 4,555,344. methods are disclosed and claimed by which the low molecular weight solvents are recovered by a change in pH of the gel or by a change in the composition of the surrounding liquid. According to the present invention, the low molecular weight solvents are recovered by slightly warming the gels. The warming causes a huge change in the amount of solvent absorbed by the gel, a shrinkage occurring because the gel is near a critical point, the temperature at which the gel is capable of undergoing a phase change.

The invention is important because separation processes are a key aspect of the chemical industry. In the past, these processes were dominated by distillation, reflecting the key role played by petroleum. Other important separations include gas scrubbing, liquid-liquid extraction, crystallization and filtration. However, there are an emerging group of separation problems for which current technology is expensive and difficult. These problems center around dilute solutions of organic or biological materials. Examples include the removal of water from dilute solutions like cheese whey, fermentation beers, and protein solutions produced by genetically-energineered microorganisms.

2. The Prior Art

Apart from the invention disclosed in my aforesaid copending application, the basic idea of using gels near a critical point as size-selective extraction solvents which can be regenerated by small temperature changes seems to be new and no relevant prior art is known. However, the use of gels for separations is not new, and phase transitions in gels have been previously reported.

Separations using gels are usually based on gel permeation chromatography (GPC). The basic apparatus used in this method consists of a packed bed of gel spheres of the same size and swollen with solvent to a constant extent. Additional solvent flows steadily through this bed. At time zero, a pulse of solution containing several high molecular weight solutes is injected at the top of the bed. As the pulse is swept down the column, different solutes are retained by the gel to different degrees. Basically, small solutes which can diffuse quickly into the gel are retarded the most, and large solutes which are excluded from the gel are swept along fastest. Thus the largest solutes are eluted most quickly, and the smallest solutes come out of the column last. The differential retention by any single gel sphere is very slight, but the total retention for all the spheres in the bed can effectively separate the solutes.

In the GPC separation, the separation is of very small amounts of similar high molecular weight solutes in a packed bed of gel swollen to a constant extent. Changes in swelling ruin the separation. According to the present invention, the separation is of potentially large amounts of one solute and a solvent using a gel whose swelling is deliberately altered by warming and cooling. Changes in swelling are central to regeneraton and reuse.

Some separations using commercial gels are based on gel absorption, with resulting volume changes. These commercial gels absorb organic molecules. The gels used are hard to regenerate, and so are burned.

The separation closest to producing the results of the present invention is ultrafiltration. For that process, water and small molecular weight solutes are forced under high pressure through a size selective membrane. Larger molecular weight solutes are retained as concentrates. The membranes can be used for many separations and can be cleaned by reversing the flow of solvent. However, membrane cost is high and the application of pressure is expensive.

SUMMARY OF THE INVENTION

Broadly stated, the invention resides in the method of selectively extracting low molecular weight solvents from solutions of higher molecular weight solutes, which invention comprises admixing the solution with a cross-linked temperature-sensitive gel. The gel has the capability of swelling by absorbing a portion of the solvent. After this absorption, the resulting remaining concentrated solution, called the "raffinate", is separated by filtration from the swollen gel. The swollen gel is regenerated for reuse initially by slight increase in temperature. This warmed gel releases most of its absorbed solvent, which is again separated from the gel by filtration. The temperature of the gel is then lowered slightly to return it to its original condition. The gel can then be reused. If necessary, the same gel can be used to further concentrate the raffinate.

BRIEF DESCRIPTION OF THE DRAWINGS

The invention is illustrated by the drawings in which:

FIG. 1 is a schematic representation in flow sheet form showing the successive steps in preferential absorption of solvent by gel and regeneration of the gel.

DETAILED DESCRIPTION OF THE PREFERRED EMBODIMENT

Figure 2:
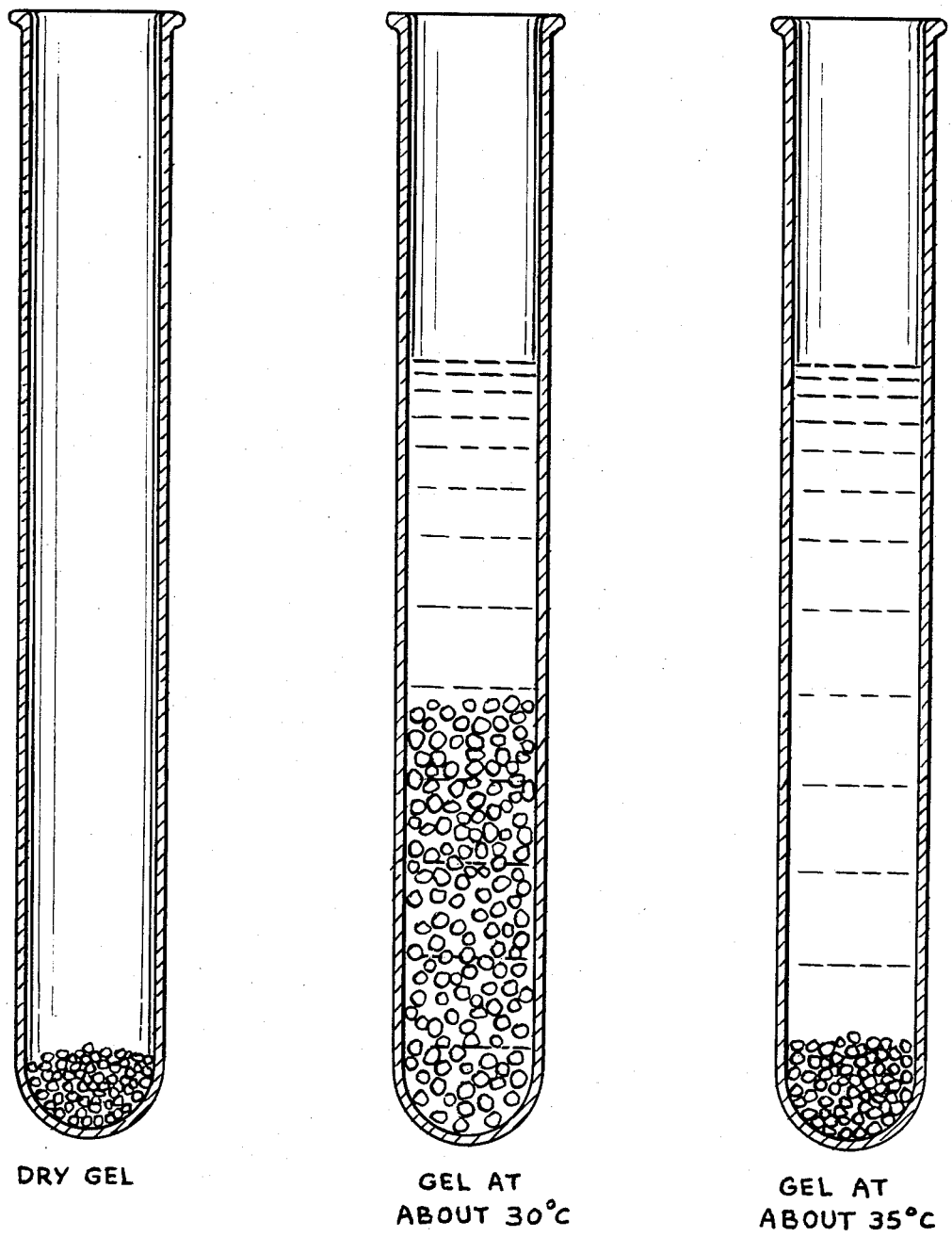
FIG. 2 is a schematic illustration of three test tubes each containing the same amount of gel, that in the first tube being dry, that in the second tube being in water at about 30° C., and that in the third tube being in water at about 35° C.

The invention is based on the use of cross-linked gels as size selective extraction solvents. The gels are effective because they absorb a low molecular weight solvent like water, but not high molecular weight solutes like proteins. They can be easily regenerated because they are near a critical point, so their swelling is a very strong function of the temperature of the surrounding solution. As a result, these gels represent an attractive new separation process.

The way in which the gels function is shown schematically in the drawings. As seen in FIG. 1, some gel spheres are added to a dilute solution. The spheres swell, absorbing the low molecular weight solvent but excluding high molecular weight solutes. The raffinate, now concentrated in the high molecular weight solutes, can then be separated from the swollen gel, as by filtration.

For an economic process, the swollen gel must now be regenerated. Because the swelling of these gels is a very strong function of temperature, warming them collapses the gel volume and releases much of the absorbed solvent. The collapsed gel is separated from the released solvent by filtration. After the gel is cooled, it can be reused.

The regeneration depends on the large changes in gel swelling due to changes in the capacity of the gel to absorb and retain liquids with small changes in temperature. These large changes in absorption capability occur because the gel is near a critical point, its lower critical solution temperature at which the gel is capable of undergoing a phase change. At lower temperatures, the gel readily absorbs liquid and is highly swollen: its volume is large. At higher temperatures, the gel is collapsed: it releases the absorbed liquid and its volume is much smaller. Over a small range of intermediate temperatures, the gel's swelling capability changes rapidly. The location of this small temperature range depends on the particular gel used.

An advantage of the process of this invention over other concentration techniques is that during the process, both small molecular weight solutes and water are removed, in proportion to their concentrations. Therefore, the environment of the medium does not change, making the method ideal for labile products such as: proteins (including enzymes), antibiotics, high molecular weight polysaccharides, microbial cells and other fermentation products.

Although the invention is described with particular reference to substituted polyacrylamides, it works well with any cross-linked gel which undergoes a rapid change of volume with changes in temperature. These are exemplified by copolymers of substituted acrylamide, such as polydiethylacrylamide, polyisopropylacrylamide, copolymers of diethylacrylamide, isopropylacrylamide, butylacrylamide and methylacrylamide, similarly substituted vinyl amine, vinyl alcohol, and ethers of vinyl alcohol. In some cases, the gels may be ionic, but the ionic character is not necessary for the process to work. The polymerization conditions of the gel can be manipulated to change the maximum diameter for permeation, thus setting a lower size limit on excluded solutes. The lower size limit is about 10 Å.

One gel was prepared from iso-propylacrylamide cross-linked with methylene bis-acrylamide. This non-ionic gel was cut into small beads. When it is placed in water at 25° C., it swells 30 times its dry weight. When it is placed in water at 35° C., it swells 3 times its dry weight. Most of this change in swelling takes place between 32° C. and 34° C.

A second gel was prepared from 97 mole % N,N-diethylacrylamide and 3 mole % sodium methacrylate. It again was cross-linked with the methylene bis-acrylamide. This partly ionic gel was also cut into small beads. When it is placed in water at 25° C., it swells 50 times its dry weight. When it is placed in water at 55° C., it swells 6 times its dry weight. At 60° C., its volume is only 5% that at 30° C. Most of this altered swelling occurs between 48° C. and 52° C. Thus minor changes in the chemical composition of the gel alter the temperature range over which the swelling changes abruptly. The dramatic change in the volume of polyisopropylacrylamide in water due to small changes in temperature is illustrated in FIG. 2.

The invention is further illustrated by the following examples:

EXAMPLE 1

An aqueous solution containing 0.5% gelatin was admixed at 30° C. with 0.03 cm particles of polyisopropylacrylamide with 1% cross linking. Half of the volume of the gelatin solution was absorbed. The gelatin concentration in the unabsorbed solution increased by a factor of 1.9 and contained 95% of the gelatin in the feed.

The swollen gel particles were then removed with a 50μ filter. The temperature of the gel was raised to 35° C. and filtered a second time. The solution releasd by shrinking of the gel contained the remaining 5% of the gelatin.

Thus, the feed solution of 0.5% gelatin was split into two solutions, one containing 0.95% gelatin and the other containing 0.05%. By lowering the temperature of the gel to below 30° C., the gel was readied for reuse.

EXAMPLES 2-13

Several different separations were accomplished using gels formed by copolymers of poly (N,N-diethylacrylamide) and sodium methacrylate and polymers of poly (isopropylacrylamide) using the procedure shown in FIG. 1. These are summarized in Table I. The efficiency in this Table is the solute concentration change observed in the raffinate divided by that expected if the swollen gel completely excludes the solute. In other words, an efficiency of 100% is a complete separation, and an efficiency of 0% is no separation at all.

From Table I, one sees that large solutes are much more efficiently separated than small solutes. The slight deviations from 100% efficiency of large solutes are commonly due to fluid entrained between the gel particles. When this entrained fluid is carefully removed, the efficiency rises. In addition, for intermediate solute sizes, the efficiency varies with the amount of cross-linking and with the conditions for polymerizing the gel. As a result it is possible to tailor a gel suitable for the separation of a particular solute.

It is apparent that many modifications and variations of this invention as hereinbefore set forth may be made without departing from the spirit and scope thereof. The specific embodiments described are given by way of example only, and the invention is limited only by the terms of the appended claims.

TABLE I

CONCENTRATION OF DILUTE AQUEOUS SOLUTIONS USING COPOLYMERS OF POLY (N,N—DIETHYLACRYLAMIDE) AND SODIUM METHACRYLATE AND POLYMERS OF POLY (ISOPROPYLACRYLAMIDE)

| | | | Percent Efficiency (a) | |
|---|---|---|---|---|
| Ex. No. | Solute | Molecular Weight | Solute Size, A | Diethyl Methacrylate (b) | Isopropyl (c) |
| 2 | Polyethylene Glycol | 400 | | 4.6 | 10.3 |

TABLE I-continued
CONCENTRATION OF DILUTE AQUEOUS SOLUTIONS USING COPOLYMERS OF POLY (N,N—DIETHYLACRYLAMIDE) AND SODIUM METHACRYLATE AND POLYMERS OF POLY (ISOPROPYLACRYLAMIDE)

| Ex. No. | Solute | Molecular Weight | Solute Size, A | Percent Efficiency (a) Diethyl Methacrylate (b) | Isopropyl (c) |
|---|---|---|---|---|---|
| 3 | Polyethylene Glycol | 13,400 | | 18.5 | 29.5 |
| 4 | Polyethylene Glycol | 8,000 | | 25.4 | 56.4 |
| 5 | Polyethylene Glycol | 18,500 | | 61.4 | 79.9 |
| 6 | Polyethylene Oxide | 600,000 | | 89.1 | 96.2 |
| 7 | Pentachlorophenol | 265 | | 50.9 | 18.2 |
| 8 | Vitamin B-12 | 1,355 | 15 | 14.6 | 32.1 |
| 9 | Ovalbumin | 45,000 | | 84.3 | 96.6 |
| 10 | Gelatin G-7 (d) | | | 90.9 | 95.3 |
| 11 | Blue Dextran | 2,000,000 | | 98.6 | 96.5 |
| 12 | Polystyrene Latex | | 600 | 96.0 | 95.4 |
| 13 | Polystyrene Latex | | 11,600 | 95.7 (e) | |

(a) Represents the degree to which a solute is excluded from the gel as water is absorbed.
(b) These gels have 4% cross-linking except as noted.
(c) These gels have 1% cross-linking.
(d) The initial concentration equals 0.5 weight.
(e) The gel used in this specific experiment had 2% cross-linking.

I claim:

1. A method for selectively extracting low molecular weight solvents from solution of higher molecular weight solutes which comprises:
   a. mixing a solution containing a low molecular weight solvent and a higher molecular weight solute with a cross-linked polymer gel selected from the group consisting of N-substituted polyacrylamides and copolymers of N-substituted acrylamide;
   b. swelling the gel to absorb a portion of the solvent from the solution by substantially maintaining the temperature of the gel at a preselected temperature slightly below the lower critical solution temperature of the gel, to yield a concentrated solution of the solute; and
   c. separating the concentrated solution from the swollen gel.

2. The method of claim 1 further comprising:
   d. warming the gel to a temperature slightly above the lower critical solution temperature of the swollen gel, so that the gel undergoes a phase change and shrinks to a reduced volume, and releases most of the absorbed solvent; and
   e. separating the solvent from the reduced volume gel.

3. The method of claim 2 wherein the concentrated solution of the solute is further concentrated by:
   a. admixing the concentrated solution with the reduced volume gel and maintaining the mixture at a temperature slightly below the lower critical solution temperature of the gel, to swell the gel and to absorb a further portion of the solution by the gel to yield a further concentrated solution; and
   b. separating the further concentrated solution from the swollen gel.

4. The method of claim 2, wherein the gel is of polyisopropyl acrylamide crosslinked with methylene bis-acrylamide and is swollen at about 25°–32° C.

5. The method of claim 4 wherein the volume of the reduced volume gel is about 10% of the volume of the swollen gel.

6. The method of claim 2 wherein the gel is a copolymer of poly(N,N-diethylacrylamide) and sodium methacrylate and is swollen at about 25°–55° C.

7. The method of claim 6 wherein the volume of the reduced volume gel is about 5% of the volume of the swollen gel.

* * * * *